United States Patent [19]

Grose

[11] 4,446,851

[45] May 8, 1984

[54] PLASTIC RADIANT EXCHANGER

[75] Inventor: Ronald D. Grose, Omaha, Nebr.

[73] Assignee: InterNorth, Inc., Omaha, Nebr.

[21] Appl. No.: 383,790

[22] Filed: Jun. 1, 1982

Related U.S. Application Data

[63] Continuation-in-part of Ser. No. 168,185, Jul. 10, 1980, abandoned.

[51] Int. Cl.³ .............................................. F24J 3/02
[52] U.S. Cl. .................................... 126/449; 126/431
[58] Field of Search .............. 126/450, 430, 448, 449, 126/432, 435, 428, 431; 165/485

[56] References Cited

U.S. PATENT DOCUMENTS

| | | | |
|---|---|---|---|
| 3,303,838 | 2/1967 | Thomason | 126/449 |
| 4,082,082 | 4/1978 | Harvey | 126/449 |
| 4,143,641 | 3/1979 | Christopher | 126/450 |
| 4,169,554 | 10/1979 | Camp | 165/485 |
| 4,224,928 | 9/1980 | Werner et al. | 126/441 |
| 4,263,896 | 4/1981 | Zebuhr | 126/450 |
| 4,266,531 | 5/1981 | Behrendt et al. | 126/449 |
| 4,271,823 | 6/1981 | Erb | 126/441 |
| 4,304,223 | 12/1981 | Novinger | 126/449 |
| 4,335,708 | 6/1982 | Holter et al. | 126/449 |

FOREIGN PATENT DOCUMENTS

| | | | |
|---|---|---|---|
| 2610901 | 9/1977 | Fed. Rep. of Germany | 126/441 |
| 2719958 | 11/1978 | Fed. Rep. of Germany | 126/449 |
| 54-152241 | 11/1979 | Japan | 126/449 |

*Primary Examiner*—James C. Yeung
*Attorney, Agent, or Firm*—Donald F. Haas

[57] ABSTRACT

A radiant energy exchanger is disclosed which comprises a relatively thin layer of gas permeable open-celled semi-opaque plastic foam, a layer of transparent gas impermeable plastic material on the side of the foam exposed to the atmosphere, and a layer of a gas impermeable reflective material on the other side of the foam.

3 Claims, 2 Drawing Figures

PLASTIC RADIANT EXCHANGER

REFERENCE TO PRIOR APPLICATION

This application is a continuation-in-part of my earlier application entitled Plastic Radiant Exchanger, Ser. No. 168,185, filed July 10, 1980, now abandoned.

BACKGROUND OF THE INVENTION

Finding an economical means for utilizing solar energy has, of course, become of prime importance in these days of energy shortages. Thus, there is a definite need for inexpensive, lightweight solar collectors which can efficiently transform solar energy into heat energy. Likewise, there is a great need for an inexpensive, lightweight apparatus which is capable of rejecting radiant energy to the atmosphere efficiently. The apparatus of the present invention functions as a solar collector and a radiant energy rejector, and further, can serve as roofing material and insulation for a structure such as a house.

Plain copper sheets with water coils attached thereto have been used as radiant exchangers for both heating and cooling purposes. These copper exchangers have no means to prevent heat loss to the atmosphere by convection. Other than the copper sheeting, traditional solar collectors of many different design types have been used for heating only and have not been intended for use in rejecting radiant energy to the atmosphere. Furthermore, these conventional solar collectors are either of metal or glass design, possibly with a plastic covering, or are made of extruded plastic. These collectors are much heavier and much more expensive than the radiant exchanger of the present invention.

U.S. Pat. No. 4,015,582, Solar Heat Collector, issued to Liu, et al. on Apr. 5, 1977, discloses a solar heat collector comprising a heat insulative base, a layer of heat absorptive material overlying the insulative base, a light transmitting insulating (against convection and infrared losses) protective covering overlying the heat absorptive material to prevent the passage of air into or out of the heat absorptive material, and means for circulating a heat transfer fluid through the collector along one or both sides of the heat absorbing layer. The absorbing surface may be in the form of a black or blackened plate or film or it also can be in the form of a porous medium such as glass fibers, painted metal fibers, or painted screens with high solar absorptivity. The light-transmitting and insulating protective cover can be in the form of glass fiber or it can also be in the form of rigid or flexible plastic foam with entrapped gas bubbles. Since in the present invention the heat transfer takes place within and throughout the heat-absorbing open-celled foam, much better heat transfer can be obtained than by the Liu, et al. invention where most of the heat transfer takes place at the outside surfaces of the heat-absorbing material and only a small amount, if any, of the heat transfer fluid passes through the heat-absorbing material because of the large pressure drop across it. Also, the open-celled foam of the present invention is less expensive and lighter in weight than the materials disclosed in the above patent.

U.S. Pat. Nos. 2,998,005, Solar Heater, and 3,875,925, Solar Heater, issued to Johnston on Aug. 29, 1961 and Apr. 8, 1975, respectively, describe solar collectors which utilize fibrous materials which are probably porous. In Johnston I, a black fiberglass fibrous mat is used to absorb solar energy without any losses due to reflection of the radiant energy. The solar energy is converted to heat in this fibrous mat and the heat is insulated from radiation to the outside by the upper layers of fiberglass. The heat is transferred to air which flows along one surface of the mat. In Johnston II, a porous fibrous material such as fiberglass is used as an outer protective layer. It allows solar energy to pass through to the back wall of the collector where it is absorbed by a black covering, but it does not allow the heat energy to pass back out of the collector. The fibrous materials disclosed in these patents do not allow the easy passage of a heat transfer fluid through them and thus cannot have the advantage of the present invention of being able to have a very large surface area for the transfer of heat to the fluid. Also, the materials disclosed in the two Johnston patents are much more expensive and heavier in weight than the open-celled foam of the present invention.

French publication No. 2,308,882, Solar Heat Trap Using Transparent Multichannel Profile to Accept Radiant and Diffuse Heat Into Dark Packing by Harvey, discloses a solar heat trap collector which is comprised of superimposed transparent channels. The lower channels are filled with fibrous or particulate packing which can absorb heat and transmit it to a heat transfer fluid which is consolidated through both the lower and upper channels. Recirculating the heat transfer fluid over the lower collection level is said to trap collected heat which would otherwise be lost by reflection or reverse radiation. There is no disclosure that this collector can be used to reject radiant energy to the atmosphere. Furthermore, the porous material used in the French publication is very much different from and much harder to handle than the open-celled foam of the present invention.

German Offenlegungsschrift No. 2,719,959, published Nov. 9, 1978, discloses a radiant heat transmitting system in which a radiation absorber with an open structure transmits heat to a gaseous or liquid heat carrier which is contained within the open structure of the absorber. It is stated that the open structure material can be a foamed plastic and polyurethane foam is specifically mentioned. A cover layer of glass or plastic is recommended. Japanese Pat. No. 54-152,241, published Nov. 30, 1979, discloses a heat absorber material for collecting solar energy which comprises an open-celled black synthetic resin foam covered with a transparent outer wall of water-proof resin or glass. The foam is preferably a hydrophilic polyurethane foam. Neither of the above patents disclose or suggest the combination of a gas impermeable layer, an open-celled foam, and a gas reflective layer as a lightweight radiant energy exchanger which is self-supporting and can serve as roofing material and insulation for a structure.

German Offenlegungsschrift No. 2,610,901, published Sept. 29, 1977, U.S. Pat. Nos. 4,143,641 patented Mar. 13, 1979, 4,224,928 patented Sept. 30, 1980, 4,263,896 patented Apr. 28, 1981, 4,266,531 patented May 12, 1981, and 4,271,823 patented June 9, 1981 all show the use of a cover layer of transparent lightweight gas impermeable material having air spaces disposed therewithin. However, none of the above patents disclose the use of such a material with an open-celled foam nor do they disclose or suggest the use of such a material in combination with a foam and a gas impermeable reflective material.

SUMMARY OF THE INVENTION

The present invention relates to a radiant energy exchanger which can absorb radiant energy and reject it to the atmosphere under appropriate conditions and which is also suitable for use as an outer protective covering for a structure such as an outside wall or roof of a building.

The exchanger has a relatively thin, lightweight layer of gas permeable open-celled semi-opaque plastic foam capable of absorbing and rejecting radiant energy and of allowing the passage of a heat transfer fluid therethrough. It is preferred that the open-celled foam consist of a polyurethane foam with a relatively large cell size. It must also have, disposed between the open-celled foam and the atmosphere to prevent loss of heat by convection, a layer of a transparent lightweight gas impermeable plastic material which is securely adhesively bonded to the foam to prevent separation of the layers and the bypass of heat transfer fluid which is caused thereby. It is preferred that the gas impermeable material be made of plastic and have air spaces disposed within. It is highly preferred that the gas impermeable material consist of a polycarbonate layer having a plurality of air-containing channels which are sealed off at the ends. Finally, there is a layer of a gas impermeable reflective material securely adhesively bonded to the other side of the foam. The reflective material has openings therein to allow controlled ingress to and egress from the foam by the heat transfer fluid.

In the preferred embodiment, the openings in the reflective material are spaced to communicate with supply and return plenums in the structure and to provide a relatively short flow path for the heat transfer fluid through the exchanger. It is highly preferred that the openings be adapted to communicate with plenums which are formed as an integral part of the structure and wherein the reflective material forms the outer walls of the plenums.

DETAILED DESCRIPTION OF THE INVENTION

Figure 1:
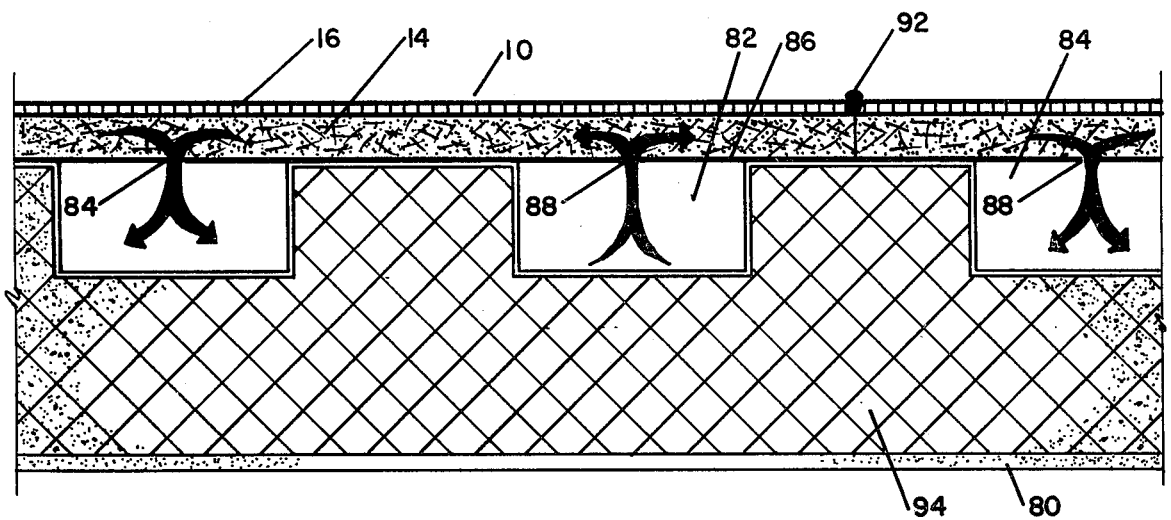
FIG. 1 shows the plastic radiant exchanger of the present invention in place on the outer wall of a structure.

The open-celled foam, the use of which is necessary for the successful performance of the radiant exchanger of the present invention, may be made from polyurethane or other materials which can form a semi-opaque porous cellular matrix having a relatively large pore size. Such structures have the unique ability of being able to absorb large amounts of radiant energy from the sun and can also allow almost unobstructed passage of a heat transfer fluid, such as air, through them with very little drop across the exchanger. This dual ability allows for a great amount of surface area for the heat transfer within the pores so that heat can be transmitted to the heat transfer fluid faster and much more efficiently. The preferred material for use herein is a relatively opaque plastic polyurethane which has an average cell diameter of about 0.1 inches and a foam density of about 2 pounds per cubic foot.

The primary technical advantage which the radiant exchanger of the present invention has over the prior art is that it collects unconcentrated energy and transfers it to the heat transfer fluid in the unconcentrated state whereas other solar collectors collect unconcentrated energy, concentrate it, and transfer it to the heat transfer fluid in the concentrated state. The heat transfer efficiency, especially for an air system will be greater when the unconcentrated energy is transferred in the unconcentrated state rather than in the concentrated state because of the temperature gradients required to concentrate energy and to transfer the concentrated energy to the fluid. For example, in a standard solar collector with three tubes connected to a copper plate the radiant energy is collected all over the surface of the plate and is then transferred by condition to the small tubes where it is effectively concentrated. The radiant exchanger of the present invention allows the unconcentrated radiant energy to be transferred in the unconcentrated state because the open-celled foam provides much greater heat transfer per unit flow of heat transfer fluid than is provided in the conventional solar collector where the heat is focused on a tube and the heat transfer takes place over a relatively small area.

A layer of a gas impermeable material covers the open-celled foam and is disposed between it and the atmosphere. It must be transparent and have the ability to prevent or substantially decrease convective heat losses from the open-celled foam to the atmosphere. The second purpose of this layer is to prevent the heat transfer fluid from escaping from the exchanger. In order to accomplish the purposes, it is preferred that the gas impermeable layer be made of a plastic material which has air spaces disposed within it. The most preferred material is a polycarbonate layer which is extruded as one piece and has a plurality of air spaces or channels which can be and should be sealed off at the ends. It is preferred that the air spaces be as small as possible because the convective losses are larger when the air spaces are larger. The air space or cell walls should be as thin as possible to minimize the conductive losses through the vertical walls from the radiant energy absorbing surface to the external surface of the collector. Finally, the gas impermeable layer should be structurally sound, capable of withstanding hail, people walking on it, etc., and environmentally sound, capable of withstanding chemical attacks such as ultraviolet light, ozone, acid rain, smog, etc.

The reflective material is extremely important to the performance of the invention. The layer of plastic foam is so thin that it will allow some solar radiation to pass through it. The reflective material will reflect much of this radiation back for a second pass through the plastic foam so it heats up the foam rather than the backing. Thus, the efficiency of the exchanger is enhanced. The reflective material can be aluminum foil or another similar reflective material.

The size of the openings in the reflective material are chosen to control ingress to and egress from the foam by the heat transfer fluid. The object is to achieve even flow distribution of the heat transfer fluid so that as much as is possible of the cross-sectional area of the exchanger is utilized in the exchange of radiant energy. Other advantages of even flow distribution are that the pressure losses are minimized and the temperature distribution is even. Both of these factors contribute to the thermal efficiency of the exchanger.

The purpose of the base in other collectors is merely to complete it as an integral unit. It will close off the bottom and the sides of the collector and seal it to prevent loss of heat and heat exchange fluid. The exchanger of the present invention is self-supporting and requires no base to support and seal it. The exchangers are connected together and sealed adhesively at the joints and the end panels when in place on a structure. An adhesive seal between the reflective material and the structure allows the surface of the structure to serve as the bottom or "base" of the exchanger.

The preferred heat exchange medium is air, primarily because it does not cost anything. Any other gaseous fluids could be used. The use of water or other liquid fluids is not preferred because their relatively high density makes it difficult for them to pass quickly and freely through the open-celled foam.

In the heating mode, radiant energy from the sun is absorbed by the open-celled foam and thereby transformed into heat energy which is transferred to the heat transfer fluid flowing transversely (to the direction of the incoming radiant energy) through the open-celled foam. This heated fluid can either be blown directly into the structure which is to be heated or it can be used with a heat pump or other system to provide the heat energy to evaporate the refrigerant.

Rejection of radiant energy to the atmosphere is the means by which the radiant exchanger of the present invention assists in providing cooling. The rejection can usually only take place at night when the environment is not providing radiant energy to the radiant exchanger. Warm air from the interior of the structure, or a heat pump, is circulated through the exchanger. The heat energy in the warm air is transferred or rejected to the atmosphere from the open-celled foam by radiation. The layer of gas impermeable material does not significantly interfere with the rejection of radiant energy.

Figure 2:
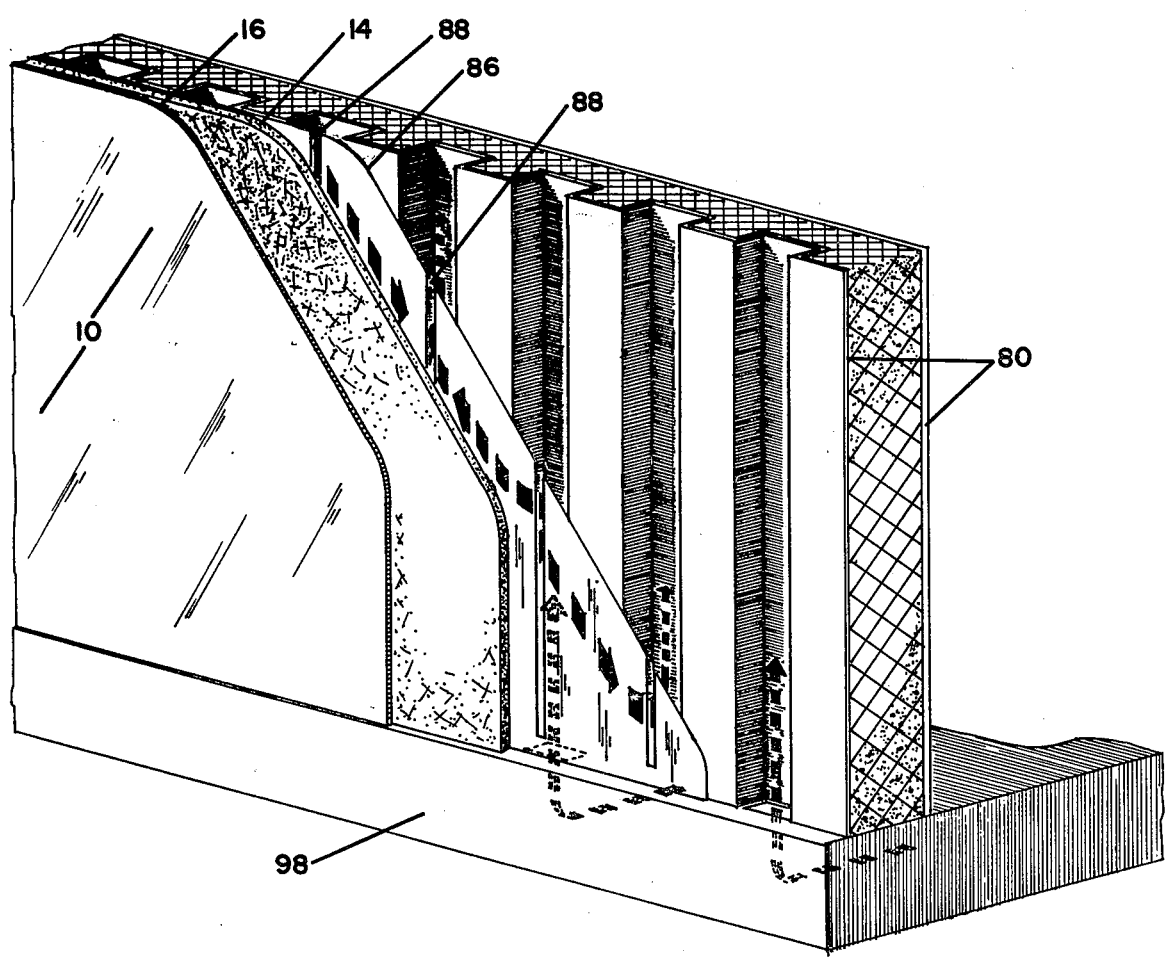
FIG. 2 is a cut-away showing the radiant exchanger and its component parts in place on the wall of the structure referred to in FIG. 1.

In a highly preferred embodiment of the present invention, the plastic radiant exchanger has a dual purpose, i.e., to serve as an absorber and rejector of radiant energy and also to serve as an outer protective covering for a structure such as a building. The accomplishment of the former purpose is discussed above. The design shown in FIGS. 1 and 2 provides a great deal more structural stability than my previous design which enables the exchanger to be used as the outer wall or roof material for a home or commercial building. As described below, the structural stability is obtained through the uniform bonding of the transparent gas impermeable material to the foam and because this type of structure provides dispersed support as opposed to point source support which is provided when discrete support members such as 2×4s, etc. are used. The load is dispersed across the entire cross-section of the exchanger rather than being focused at individual points. This allows the use of a material which otherwise would be too structurally weak for the purpose.

As opposed to my previous design for the radiant exchanger, this preferred embodiment utilizes a relatively thin layer of the gas permeable open-celled semi-opaque plastic foam. The thinness of the foam, and as a consequence, the lower cost of the exchanger, is made possible by the positioning of the openings in the layer of gas impermeable reflective material.

There are a multiplicity of supply and return openings in the exchanger and the openings themselves are spaced relatively close together so that the heat transfer fluid has only a relatively short transverse flow path through the foam exchanger material. This allows the attainment of the same amount of energy transfer with a thinner layer of foam. A further advantage is that the pressure drop between the supply and return openings is much less when the transverse flow path is shorter and more supply and return openings are used. The advantage of a low pressure drop is that a minimal amount of blower energy is required to realize the solar to thermal energy conversion in the exchanger. Finally, the short transverse flow path increases the thermal efficiency of the exchanger because of a more uniform temperature distribution both laterally and transversely in the foam exchanger.

It is extremely important that the layer of transparent lightweight gas impermeable plastic material, which preferably is the polycarbonate material discussed above, be securely and completely bonded to the foam. If there are any open or unbonded areas between the two materials, the heat transfer fluid will take the path of least resistance (lowest pressure drop) and flow through the open or unbonded areas. The efficiency of the exchanger will drop drastically because the portion of the foam beneath the open or unbonded areas will be bypassed and the transfer of radiant energy will not take place to the desired extent. The same problem can occur if the layer of gas impermeable reflective material is not securely bonded to the foam.

In order to avoid the flow bypass problem, the layers are bonded together adhesively. The gas impermeable material can be bonded to the open-celled foam with an adhesive which is a blend of polyethylene and a small amount (i.e., 0.2%) of maleic anyhdride grafted polypropylene. One example is Admer NF 500 made by Mitsui Petrochemical Company. The open-celled foam can be bonded to the reflective material with an acrylic-based adhesive. One example is 3M Y967 made by the 3M Company. The reflective material can also be bonded to the wall or roof structure with an acrylic-based adhesive. One example is 3M-2226 made by the 3M Company.

In FIG. 1, the heat transfer fluid flows from the supply plenum 82 through the opening 88 into the foam 14 where the radiant energy transfer takes place. Then the heat transfer fluid flows out of the foam through other openings 88 in the reflective material 86 into the return plenum 84 and thence into the structure to be heated or cooled. The figure also shows the joining and sealing of two radiant exchangers by joining member 92. Joining member 92 can be silicon seal joining means or another structurally sound means for accomplishing the same purpose. The structure is insulated with insulating material 94.

FIG. 2 is a perspective cut-away view of the exchanger 10 in place on a wall 80. FIG. 2 shows how the exchanger 10 and the wall 80 can be connected to a floor structure 98 from which the heat transfer fluid flows.

I claim:

1. An apparatus for radiant energy exchange having the capacity to absorb radiant energy and reject it to the atmosphere under appropriate conditions, and suitable for use as an outer protective covering, comprising a structure having open supply and return plenums formed as an integral part thereof and a radiant energy exchanger secured thereto, said exchanger comprising:
   (a) a relatively thin layer of gas permeable open-celled semi-opaque plastic foam capable of absorbing and rejecting radiant energy and of allowing the passage of a heat transfer fluid therethrough, (b) a layer of transparent lightweight gas impermeable plastic material, having air spaces disposed therewithin, disposed between the open-celled foam and the atmosphere to prevent loss of heat by convection from the exchanger, said impermeable plastic material being securely adhesively bonded to said foam to prevent separation thereof and heat transfer fluid bypass caused thereby, and (c) a layer of gas impermeable reflective material which:

(i) forms the outer walls of said plenums of said structure when said exchanger is secured thereto, (ii) has openings therein spaced to communicate with said plenums to provide more than one relatively short transverse flow path of said heat transfer fluid through said exchanger and to allow controlled ingress to and egress from said foam by said heat transfer fluid, and (iii) is securely adhesively bonded to said foam opposite said impermeable plastic material to prevent separation thereof and heat transfer fluid bypass caused thereby.

2. The apparatus of claim 1 wherein said foam is a plastic foam with a relatively large cell size.

3. The apparatus of claim 1 wherein the gas impermeable plastic material consists of a polycarbonate layer having a plurality of air-containing channels which are sealed off at the ends.

* * * * *